O. A. PARKER.
VEHICLE WHEEL.
APPLICATION FILED JAN. 3, 1916.

1,289,248.

Patented Dec. 31, 1918.

INVENTOR,
Orel A. Parker,
BY Hull, Smith, Brock & West
ATT'YS.

UNITED STATES PATENT OFFICE.

ORREL A. PARKER, OF CLEVELAND, OHIO.

VEHICLE-WHEEL.

1,289,248.  Specification of Letters Patent.  Patented Dec. 31, 1918.

Application filed January 3, 1916. Serial No. 69,714.

*To all whom it may concern:*

Be it known that I, ORREL A. PARKER, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to vehicle wheels, and more particularly to means whereby rims may be conveniently and efficiently applied to and removed from the coöperating portions of a wheel body proper, the embodiments of the invention illustrated herein pertaining to the application and removal of the rims to spoke ends.

In my pending application No. 29,690, filed May 21, 1915, I have shown, described and claimed means whereby demountable rims may be conveniently applied directly to the ends of the spokes of a wheel in and through fastening devices that are contained within the spoke ends and which may be projected into and out of engagement with the rims for the purpose of holding the same. In my copending application No. 69713 filed Jan. 3, 1916, there are shown, described and claimed means whereby a rim having a felly thereon may be conveniently and efficiently applied to and removed from the ends of spokes of the same general type as disclosed in my application No. 29690 aforesaid. In this application, the means for securing the rim to the spoke ends are carried by the rim, and certain parts thereof are adapted to be projected from the rim into and out of operative relation to a corresponding portion of the spoke end.

Figure 1:
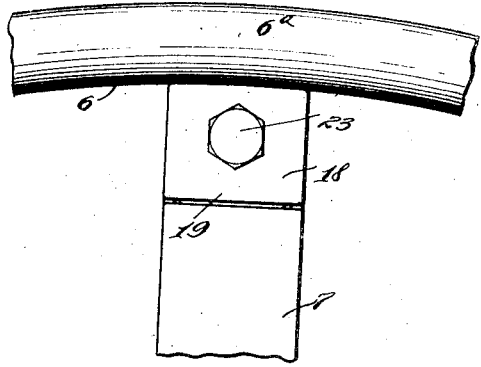
Figure 4:
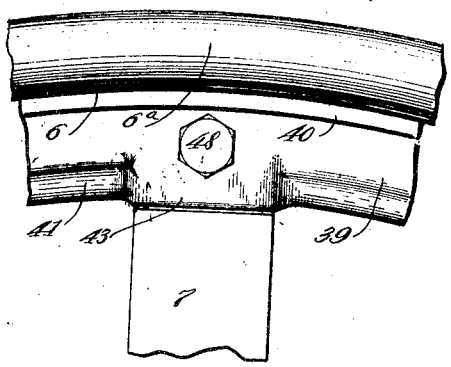
Figure 2:
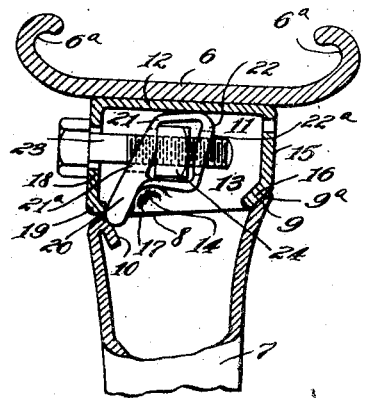
Figure 5:
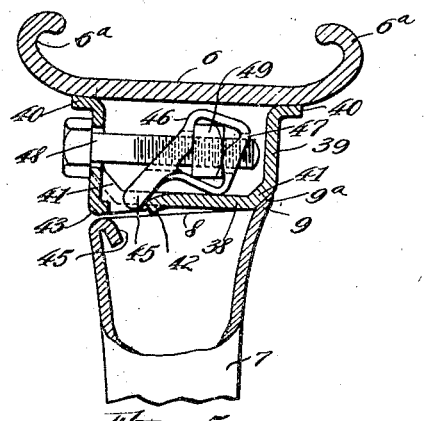
Figure 3:
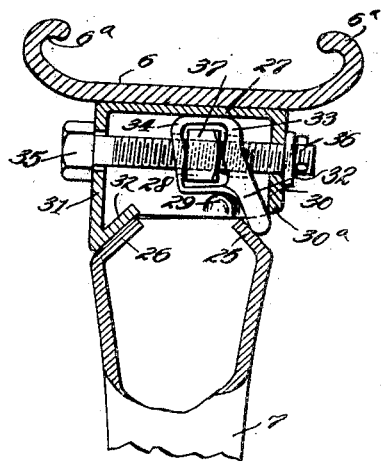
Figure 6:
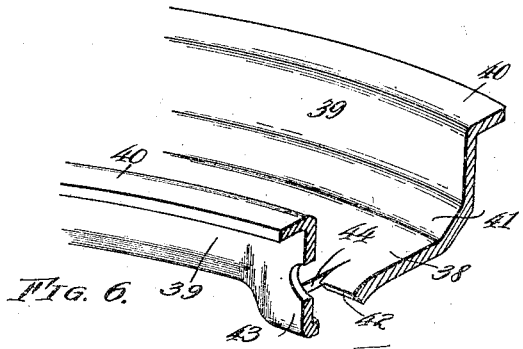

It is one of the objects of this invention to provide means whereby rims may be conveniently and efficiently applied to and removed from wheel bodies in and through movable members carried by the rim or some part connected thereto. Further and more limited objects of the invention will appear hereinafter and will be attained in and through the combinations of elements set forth in the claims hereto annexed and illustrated in the drawings forming part hereof, wherein Figure 1 represents a side elevation of a spoke and of the coöperating portion of a rim; Fig. 2 represents a transverse sectional view through the outer end of such spoke and through the corresponding portion of the rim; Fig. 3 is a view, similar to Fig. 2, illustrating a further modification of the form of invention embodied in Figs. 1 and 2; Fig. 4 is a view, similar to Fig. 1, of a modification of the invention shown in the former figure; Fig. 5 is a view, similar to Fig. 2, of the invention shown in Fig. 4 the locking member being shown in its retracted or inoperative position; while Fig. 6 is a detail in perspective of the felly shown in Figs. 4 and 5.

Describing by reference characters the various parts illustrated herein, 6 indicates a rim, which may be of any standard or approved form, the rim having the side flanges 6$^a$, 7 denotes a hollow metallic spoke having its outer end transversely beveled, as indicated at 8, and having at the inner side of such bevel a lateral seat 9 having an inclined seating surface 9$^a$. The opposite or outer side of the spoke is provided with an inclined seat 10, which may be conveniently formed by bending inwardly and radially a lip at the outer end of the outer side of the spoke. 11 denotes generally a cup, which may be secured to the rim in any convenient manner, as by brazing or welding, it being understood that in the preferred embodiment of my invention there will be as many of these cups as there are spokes. The cup shown herein is substantially rectangular in transverse section, having an outer wall or web 12 by which it may be secured to the rim and having four radially projecting walls two of which, 13, extend transversely with respect to the rim and are provided with opposed inwardly pressed bosses 14 similar to the bosses shown in the cups of my application No. 29,690. In addition to the walls 13, the cup is provided with an inner wall 15 having at its end an inclined seating portion 16 which is adapted to coöperate with the inclined seat 9$^a$. The spoke-facing end of the cup is beveled laterally, as shown at 17, providing a clearance with the coöperating beveled sides of the spoke end. The outer side wall 18 of the cup has its spoke-facing end preferably turned inwardly, as shown at 19, and in close proximity to the adjacent side wall of the spoke 7, whereby the joint between these parts is substantially closed.

Within the cup 11 there is mounted a locking member which is similar to the locking members within the ends of the spokes shown in my application aforesaid, No. 29690. Each locking member comprises a body having a locking portion or toe 20 which is guided between the bosses 14 and the lip 19 and which is adapted to be projected between said bosses and said lip and into engagement with the inclined seat 10. The locking member has formed therewith a cage the opposed branches 21 and 22 whereof are provided with perforations 21ª and 22ª, respectively, for the reception of the cap bolt 23 which extends loosely therethrough, said bolt having a nut 24 within the cage.

With the parts constructed and arranged as described, the operation will be readily understood. The rim will be applied to the ends of the spokes with the portion 16 in engagement with the inclined seat 9ª, the locking member being retracted within the cup 11 (as indicated in Fig. 5). By taking up on the bolt, the nut 24, bearing against the branch 21 of the cage, will project the head of the locking member through the space formed between the bosses 14 and the lip 19 and into engagement with the seat 10, thus thrusting the rim inwardly and firmly against and upon the seat 9ª, the end of the locking member being meanwhile seated upon the outer sides 10 and the outer end of the cage bearing against the cup wall 12.

In Fig. 3 there is shown a modification of the invention illustrated in Figs. 1 and 2 wherein the inner and outer sides of the spoke ends 7 are bent inwardly, as shown at 25 and 26, and wherein the cup on the rim and the arrangement of the locking member therein are correspondingly modified. In this view, 27 denotes the outer wall of the cup which is secured to the rim and 28 one of the opposed walls provided each with a boss 29. 30 denotes the inner side wall of the cup having its spoke-facing end 30ª, such end forming with the bosses a guideway for the locking member. The opposite or outer side wall 31 of the cup is flanged and the flange is bent upon itself, as shown at 32, to form a seating portion adapted to coöperate with the inclined seat 26. The locking member comprises a toe 32 which is adapted to be projected between the bosses 29 and the end of the radially projecting side wall 30 of the cup, into engagement with the inclined seat 25 at the inner side of the spoke end. The locking member, as is the case with the locking member in the preceding modification, is provided with a cage, in the opposite branches 33 and 34 whereof there are apertures through which and the lateral walls 30, 31 of the cup the cap bolt 35 extends, said bolt being provided with a washer 36 adapted to engage the inner wall of the cup, the washer being retained by a cotter pin 36ª. The bolt is provided with a nut 37 between the branches of the cage of the locking member.

With the parts arranged as ilustrated and described, the bolts 35 having been operated so as to withdraw the locking members within the cups, the operator applies the rim to the spoke ends with the seating portions 30 engaging their corresponding seats 26. Then, by taking up on the bolts 35, the toes of the locking members are projected into engagement with the seats 25, the outer end or toes of these members being in engagement with the parts 25 and 30ª and the outer ends of the cages engaging the cup wall 27.

It will be observed that in both modifications of this invention, the cups carried by the rims are of such shape and so located as to form in effect extensions of the spokes and that the joints between the cups and the spoke ends are substantially closed.

In Figs. 4, 5 and 6 there is shown a further modification where, instead of using separate cups upon the rim, I may provide the rim with a hollow metallic felly, mounting the locking members in such felly. In these views, 6 denotes the rim and 7 one of the spoke ends of the wheel. The spoke end shown herein is similar to that shown in Figs. 1 and 2, and the corresponding parts are designated by the same reference characters that are employed on Figs. 1 and 2. The felly comprises a U-shaped pressed metal member having a bottom or inner web 38 and the flanges 39, said flanges being bent outwardly at their ends to provide rim-engaging portions 40 whereby the felly may be welded, brazed, or otherwise suitably secured to the rim. At the junction of the web and the side flanges, the felly is preferably beveled, as shown at 41, whereby a seating portion is provided to coöperate with the inner lateral seats 9ª on the spoke ends. At suitable distances apart—corresponding with the location of the spoke ends—the web 38 is slotted for the passage of the locking members, and inwardly projecting lips are formed (similar to the lips 19 of Figs. 1 and 2) thereby to overhang the spoke ends and form substantially flush joints therewith. Each slotted guideway for a locking member may be conveniently formed by removing from the web a rectangular piece of metal and extending the transverse slots a sufficient distance to enable an inwardly inclined lip, 42 to be pressed from the web. The metal opposite the lip 42 will be bent so as to form a radially extending lip 43 similar to the lip 19, said lip so coöperating with the lip 42 and with the sides 44 of the slot in the web as to guide the locking member and to substantially cover the joint between the outer end of the spoke and this portion of the felly.

The locking member shown herein is substantially identical with those shown in the preceding modifications and comprises a toe, or seat-engaging portion, 45 and a cage the opposite branches 46, 47 whereof are slotted to receive the cap bolt 48 having the nut 49 within the cage. The parts will be so proportioned that, when the locking device is in its retracted position, the toe will be within the slot formed between the lips 42 and 43 and the side edges 44 of the slot— with one of the corners of the cage resting on the web.

With the parts constructed and arranged as described, the operator applies a rim to the spoke ends in such manner that the inclined surfaces 41 will engage the seats 9ª and with the lips 43 in substantial alinement with the spoke ends. Then, by taking up on the bolts 48, the locking devices will be projected through their respective slots and into engagement with their respective seating portions or lips 10, whereby the rim will be firmly held upon the seats 9ª and 10. By operating the bolts in the reverse direction, the locking devices will be retracted and the rim, with its felly, may be conveniently removed.

Having thus described my invention, what I claim is:—

1. The combination, with a spoke having a lateral seat, of a rim, a hollow member carried thereby and having a portion adapted to engage said seat, and a movable locking member within such hollow member and adapted to be moved into engagement with another portion of the spoke thereby to lock the rim in place upon such spoke.

2. The combination, with a spoke having a lateral seat, of a rim, a hollow member carried thereby and having a portion adapted to engage said seat, and a locking member movable into and out of engagement with another portion of the hollow rim member and another portion of the spoke end.

3. The combination with a spoke having at one side thereof an inclined seat and having at its opposite side a reversely inclined seat, of a rim having a projection adapted to engage the first mentioned seat, a locking member arranged within the projection and adapted to be moved into and out of engagement with the second seat, and means carried by said projection for so operating the locking member.

4. The combination, with a spoke having its outer end beveled transversely whereby one side of said spoke will project a greater distance from the center or hub of the wheel than the other and having a seat at such longer side, of a rim having a hollow member therewithin, said member being also transversely beveled, complementarily to the end of said spoke, and said member having a portion adapted to engage the projecting end of the spoke, and a locking device within the hollow member within the rim and adapted to be projected into and out of such hollow member and into and out of engagement with a portion of the spoke on the opposite side from the seat.

5. The combination, with a spoke having at one side thereof a seat, of a rim having a hollow member secured thereto and projecting inwardly therefrom, said hollow member having a portion adapted to engage said seat, a locking member within such hollow portion adapted to be projected into and out of engagement with another portion of said spoke, means operatively connected with such hollow member for so projecting such locking member, said hollow member having a skirt or extension adapted to extend into substantial contact with the adjacent portion of the spoke thereby to substantially close the space between the spoke and the portion of the hollow member adjacent thereto.

6. The combination, with a spoke having a seating portion, of a rim having a hollow member secured thereto and projecting inwardly therefrom, said hollow member having a portion adapted to engage the seating portion of the spoke, a locking member within such hollow portion adapted to be projected into and out of engagement with another portion of said spoke, and means operatively connected with such hollow member for so projecting such movable member into and out of engagement with such corresponding portion of the spoke.

7. The combination, with a wheel having a plurality of spokes, each having a lateral seating portion, of a rim, a hollow felly secured to said rim and having a portion thereof adapted to engage the seats on said spokes, locking members within said felly, and means carried by said felly for moving said locking members into and out of engagement with another portion of the spokes.

8. The combination, with a wheel having a plurality of spokes each having at one side thereof a seating portion, of a rim having a hollow felly, the inner wall of said felly being provided with a plurality of slots, one for each of said spokes, a locking device for each spoke movable along the inner wall of said felly and adapted to have its end projected through a slot in such wall and into engagement with a portion of the spoke corresponding thereto, and means carried by said felly for so moving said locking devices.

9. The combination, with a wheel having a plurality of spokes having at one side thereof a seating portion, of a rim having a hollow felly, the inner wall of said felly being provided with a slot, a locking device movable along the inner wall of said felly and adapted to have its ends projected through the slot in such wall and into engagement with a portion of the spoke corresponding thereto, and means carried by said felly for so moving said locking device.

10. The combination, with a wheel comprising a plurality of spokes each having a lateral seating portion, of a rim, a hollow felly carried by the rim and having a portion adapted to engage the seating portions of the spoke ends, the said felly having in its inner wall a plurality of slots, one for each of said spokes, a locking device for each of said spokes located within the felly and movable along the inner wall thereof and adapted, by such movement, to have a portion thereof projected through a slot and into and out of engagement with a portion of a spoke corresponding thereto, means connected with each locking device for so moving the same into and out of operative relation to the corresponding spoke, the metal at one side of each of said slots being extended radially whereby it will be substantially flush with the corresponding lateral wall of the spoke thereby to substantially seal the same.

11. The combination, with a wheel comprising a plurality of spokes each having a lateral seating portion, of a rim, a hollow felly carried by the rim and having a portion adapted to engage the seating portions of the spoke ends, a movable locking device for each spoke located within the felly and adapted, by its movement, to have a portion thereof projected into and out of engagement with a portion of a spoke corresponding thereto, means connected with each locking device for so moving the same into and out of operative relation to the corresponding spoke, the felly having side extensions which substantially seal the joints between the felly and the corresponding portions of the spoke ends.

12. The combination, with a spoke having the opposite sides of its end bent to form inclined seats, of a rim having a hollow member secured thereto and projecting radially therefrom, one of the lateral walls of said hollow member being provided with an inclined portion adapted to engage one of the lateral inclined seats provided on the said spoke end, a locking member within such hollow member and adapted to be projected into and out of engagement with the opposite inclined seating portion of the spoke and to form a bearing with such inclined portion and with a wall of such hollow member, and means carried by said hollow member for so operating the locking member.

13. The combination, with a spoke having the opposite sides of its end bent to form inclined seats, of a rim having a hollow member secured thereto and projecting radially therefrom, one of the lateral walls of said hollow member being provided with a portion adapted to engage one of the lateral inclined seats provided on the said spoke end, a locking member within such hollow member and adapted to be projected into and out of engagement with the opposite inclined seating portion of the spoke and to form a bearing with such inclined portion and with a wall of such hollow member, and means for so operating the locking member.

In testimony whereof, I hereunto affix my signature.

ORREL A. PARKER.